United States Patent [19]
Funahashi et al.

[11] Patent Number: 5,774,672
[45] Date of Patent: Jun. 30, 1998

[54] DATA TRANSMISSION SYSTEM FOR DISTRIBUTING VIDEO AND MUSIC DATA

[75] Inventors: Yasuhiro Funahashi; Kazunori Ikami; Osamu Nishimura; Yuji Kiyohara, all of Nagoya; Yoshihiko Hibino, Hashima-gun; Yuichi Yasutomo, Nagoya, all of Japan

[73] Assignees: Brother Kogyo Kabushiki Kaisha; Xing Inc., both of Nagoya, Japan

[21] Appl. No.: 841,335

[22] Filed: Apr. 30, 1997

Related U.S. Application Data

[63] Continuation of Ser. No. 274,750, Jul. 14, 1994, abandoned.

[30] Foreign Application Priority Data

Jul. 16, 1993 [JP] Japan .................................. 5-177013

[51] Int. Cl.⁶ ...................................................... H04L 5/00
[52] U.S. Cl. ............................... 395/200.61; 395/200.33; 395/200.57; 395/200.68; 340/825.08; 348/6; 348/738; 84/609; 84/645
[58] Field of Search ............................... 348/6, 484, 738; 398/154, 200.61, 200.18, 200.33–200.57; 340/825.08; 84/609, 648

[56] References Cited

U.S. PATENT DOCUMENTS

| | | | |
|---|---|---|---|
| 4,887,152 | 12/1989 | Matsuzaki et al. | 358/86 |
| 5,131,311 | 7/1992 | Murakami et al. | 84/609 |
| 5,208,665 | 5/1993 | McCalley et al. | 358/86 |
| 5,233,438 | 8/1993 | Funahashi et al. | 358/341 |
| 5,243,123 | 9/1993 | Chaya | 84/609 |
| 5,252,775 | 10/1993 | Urano | 84/645 |
| 5,319,452 | 6/1994 | Funahashi | 348/6 |
| 5,335,073 | 8/1994 | Yamamoto | 348/738 |
| 5,416,526 | 5/1995 | Yamamoto | 348/484 |
| 5,420,933 | 5/1995 | Zampini et al. | 381/119 |
| 5,548,281 | 8/1996 | Funahashi et al. | 340/825.08 |

FOREIGN PATENT DOCUMENTS

| | | |
|---|---|---|
| 098226 | 1/1984 | European Pat. Off. . |
| 2619661 | 6/1988 | France . |
| 2118750 | 11/1983 | United Kingdom . |
| 2171578 | 8/1986 | United Kingdom . |
| 2208986 | 4/1989 | United Kingdom . |

Primary Examiner—Christopher B. Shin
Attorney, Agent, or Firm—Oliff & Berridge, PLC

[57] ABSTRACT

In the karaoke system 1, a center 3 is connected to a plurality of karaoke terminals 5 by a coaxial cable 7. The center 3 divides the karaoke song data stored in the memory device 13 over several channels and transmits all the karaoke song data within a fixed time period in succession to the karaoke terminals 5 via the coaxial cable 7. This operation is performed regardless of whether or not a song is requested from one of the karaoke terminals 5. Whether the karaoke data transmitted in succession is data of a requested song is determined by the control portion 41 of a karaoke terminal 5. If so, karaoke performance processes are performed wherein the karaoke data is reproduced and the orchestral accompaniment and lyric image is outputted.

19 Claims, 5 Drawing Sheets

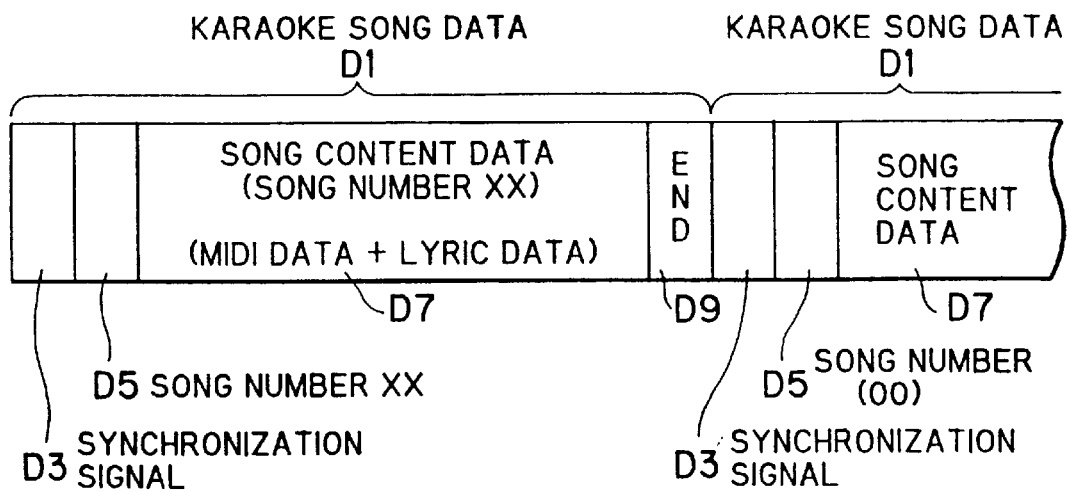

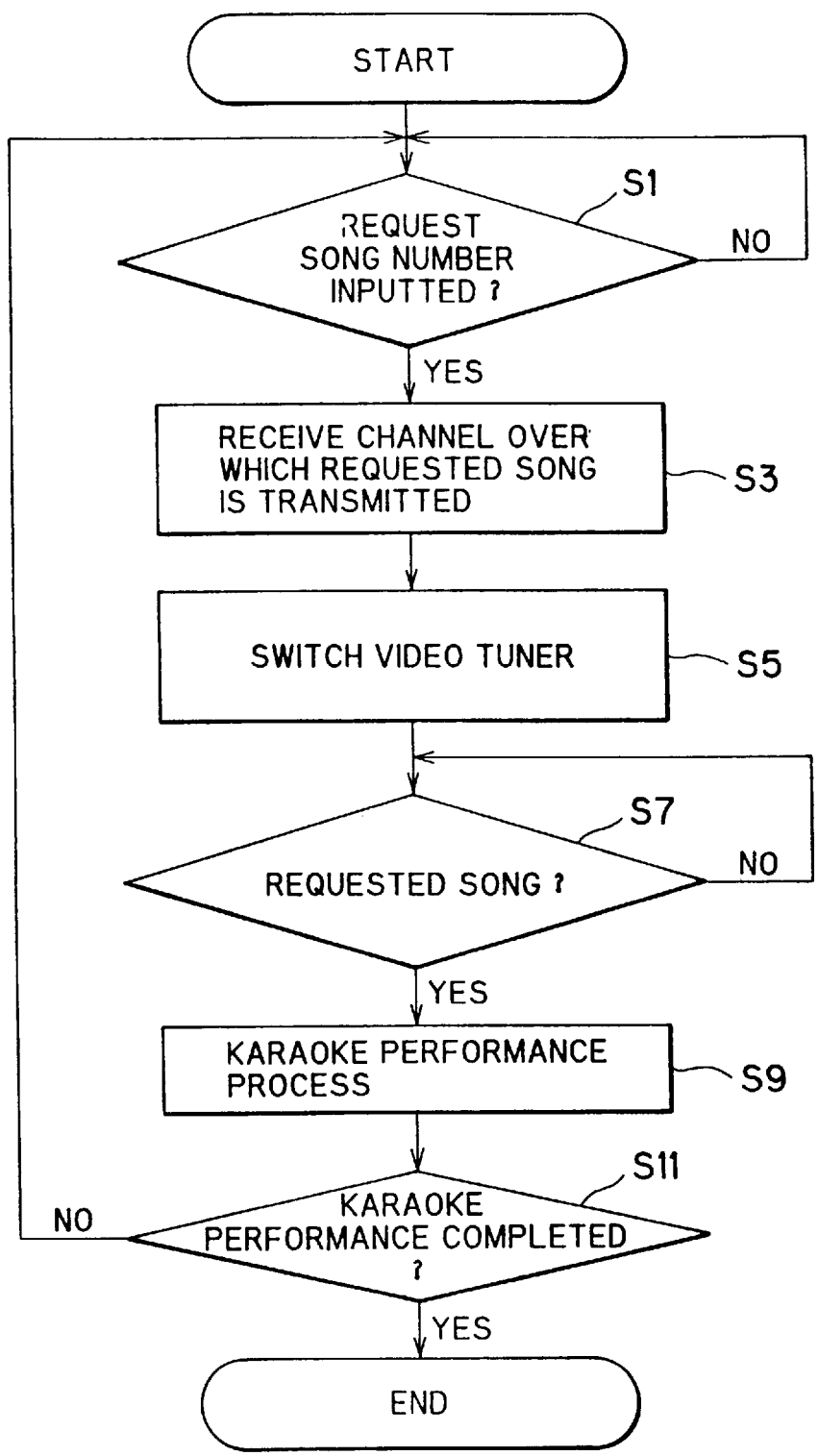

DATA TRANSMISSION SYSTEM FOR DISTRIBUTING VIDEO AND MUSIC DATA

This is a Continuation of Application Ser. No. 08/274,750 filed Jul. 14, 1994 now abandoned.

BACKGROUND OF THE INVENTION

1. Field of the Invention

The present invention relates to a data transmission system wherein a central control device and a plurality of terminals are connected by a transmission line, the data transmission system being for transmitting information data from the central control unit to each terminal.

2. Description of the Related Art

Conventionally, there is known a data transmission system, wherein a center (central control unit) is connected to a plurality of terminals by a transmission line. The data transmission system is for transmitting information data including various types of information to a terminal from a center according to demands from the terminal side. An advantage of this type of data transmission system is that a memory device for prestoring data information need not be provided to each terminal, so that the terminals have an extremely simple construction.

SUMMARY OF THE INVENTION

In the data transmission system, it can be proposed that transmission and reception of the information data is controlled by polling between the center and the terminal. That is, a polling signal is transmitted in succession from the center to the plurality of terminals. Each terminal is interrogated to determine whether the each terminal requests transmission of information data. When there is a transmission request at a terminal that has received the polling signal, the request data, which indicates the content and the like of the request, is transmitted from the terminal to the center. After the request data has been received at the center side, the desired information data is transmitted to the terminal.

According to this method, however, because the data transmission system interrogates about the data transmission requests at all the terminals in succession, a transmission request made at a terminal will not be responded to until polling for all other terminals is completed. This will cause a problem in that a long time is required for the desired data to be transmitted from the center.

Particularly, a large scale system with external transmission lines can have a great many terminals so that information data can not be transmitted quickly to individual terminals.

It is therefore an objective of the present invention to overcome the above-described problems and to provide a data transmission system wherein a terminal can obtain desired information data with a short waiting time.

In order to achieve the above-described objectives, the present invention provides a data transmission system for transmitting, to each of a plurality of terminals, information which the each terminal desires to receive, the data transmission system comprising: a central control unit; and a plurality of terminals connected to the central control unit via a transmission line, wherein the central control unit includes data transmission means for transmitting a plurality of data units, each indicative of an individual information, to each of the plurality of terminals via the transmission line, and wherein each of the plurality of terminals includes selecting means for selecting a data unit, indicative of information that the each terminal desires to receive, from the plurality of data units transmitted from the central control unit.

According to another aspect, the present invention provides a data transmission system for transmitting information from a central control unit toward a plurality of terminals connected to the central control unit via a transmission line, the data transmission system comprising: a central control unit; and a plurality of terminals connected to the central control unit via a transmission line, wherein the central control unit includes data transmission means for serially transmitting a plurality of information data units of a plurality of individual information to each of the plurality of terminals via the transmission line, and wherein each of the plurality of terminals includes: data selecting means for selecting an information data unit of a desired information from the plurality of information data units serially transmitted from the central control unit; and output means for processing the information data unit selected by the data selection means and outputting the desired information.

The central control unit may further include: data multiplexing transmission means for dividing the plurality of information data units to a plurality of channels and serially transmitting them to each of the plurality of terminals via the transmission line over the corresponding channels; and channel information transmission means for transmitting channel information that indicates which of the plurality of channels each information data unit is transmitted on to each of the plurality of terminals.

According to a further aspect, the present invention provides a data transmission system for transmitting information from a central control unit toward a plurality of terminals connected to the central control unit via a transmission line, the data transmission system comprising:

a central control unit; and a plurality of terminals connected to the central control unit via a transmission line, wherein the central control unit includes: data input means for inputting a plurality of new information data units of a plurality of new information; and data transmission means for serially transmitting the plurality of new information data units inputted to the data input means to each of the plurality of terminals via the transmission line, and wherein each of the plurality of terminals includes: memory means for previously storing a plurality of original information data of a plurality of original information, the memory means storing the plurality of new information data serially transmitted from the data transmitting means; data selection means for selecting an information data unit of a desired information from the plurality of original information data units and the plurality of new information data units stored in the memory means; and output means for processing the information data unit selected by the data selection means and outputting the desired image.

The central control unit may further include: data multiplexing transmission means for dividing the plurality of new information data units to a plurality of channels and serially transmitting them to each of the plurality of terminals via the transmission line over the corresponding channels; and channel information transmission means for transmitting channel information that indicates which of the plurality of channels each new information data unit is transmitted on to each of the plurality of terminals.

BRIEF DESCRIPTION OF THE DRAWINGS

The above and other objects, features and advantages of the invention will become more apparent from reading the following description of the preferred embodiment taken in connect ion h the accompanying drawings in which:

FIG. 4 is an explanatory diagram indicating structure of the karaoke song data of the concrete examples of the first and second embodiments;

FIG. 5(a) is an explanatory diagram indicating channel structure for transmitting the karaoke song data of the concrete example of the first embodiment, a 5 (b) is an explanatory diagram indicating channel structure for transmitting the karaoke song data of the concrete example of the second embodiment;

FIG. 6 is a flowchart indicating operations of karaoke terminal of the concrete example of the first embodiment and FIG. 7 is a schematic structural diagram showing the basic structure of the second embodiment of the present invention,

DETAILED DESCRIPTION OF THE PREFERRED EMBODIMENTS

Figure 1:
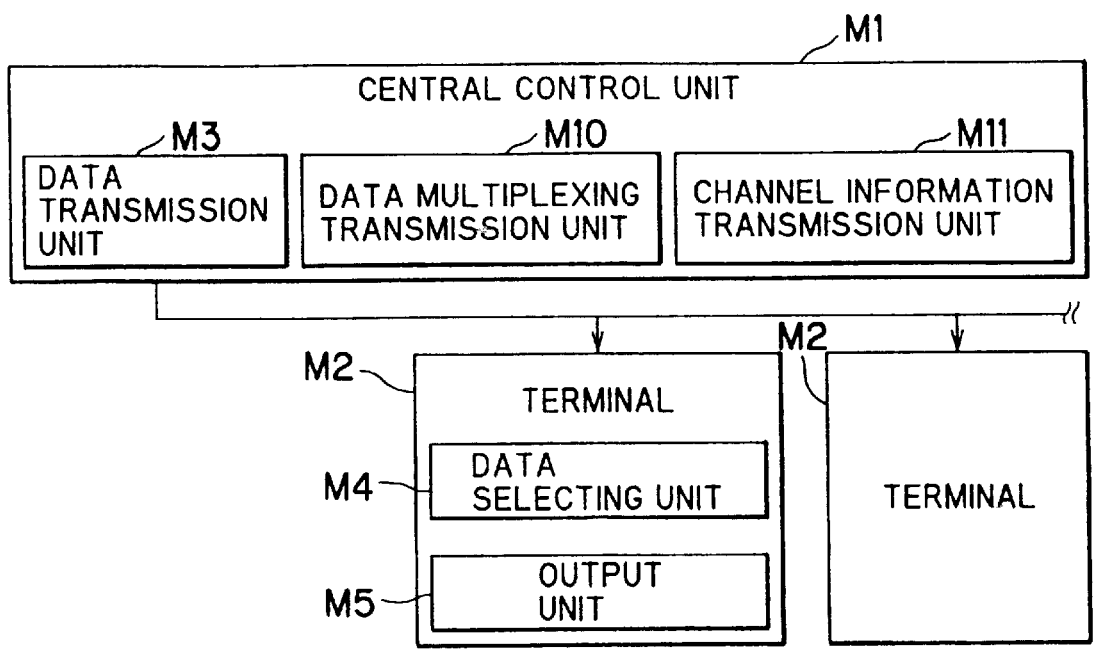
FIG. 1 is a schematic structural diagram showing the basic structure of a first embodiment of the present invention

A data transmission system according to first and second preferred embodiments of the present invention will be described while referring to the accompanying drawings wherein like parts and components are designated by the same reference numerals as those shown in FIGS. 1 through 7 to avoid duplicating description.

A data transmission system according to a first embodiment will be described below with reference to FIGS. 1–6.

As exemplified in FIG. 1, in a data transmission system of the first embodiment, a central control unit Ml and a plurality of terminals M2 are connected by a transmission line. The data transmission system is for transmitting information data including image information and/or sound information to the plurality of terminals M2 from the central control unit M1. The information data are prepared in the form of a plurality of information data units. The central control unit M1 includes a data transmission unit M3 for serially transmitting the plurality of information data units to the terminals M2. Each of the terminals M2 includes a data selecting unit M4 for selecting data units of desired information data from the plurality of information data units serially transmitted from the central control unit Ml; and an output unit M5 for reproducing the information data units selected by the data selection unit M4 and outputting the image information and/or the sound information.

According to the data transmission system constructed as described above, the data transmission unit M3 provided in the central control unit Ml prepares information, including image and/or sound information, in the form of the plurality of information data units and serially transmits them to the terminals M2. The data selection unit M4 in each terminal M2 selects data units of desired information from the plurality of information data units serially transmitted from the central control unit M1. The output unit M5 reproduces the selected information data unit and outputs the image information and/or the sound information included in the information data unit. Accordingly, there is no need to transmit polling signals in succession from the central control unit M1 to the plurality of terminals M2. Therefore, desired information data can be quickly obtained with only a short waiting period at the terminal M2.

The central control unit M1 may preferably include a data multiplexing transmission unit M10 for dividing the plurality of information data units to several channels and serially transmitting them over each of the channels to the terminals; and a channel information transmission unit M11 for transmitting channel information that indicates over which of the several channels each of the plurality of information data units is transmitted to the terminals. In this case, the data multiplex transmission unit M10 divides the plurality of information data over the several channels and serially transmits them over each of the several channels to the terminals M2. The channel information transmission unit M11 transmits to the terminals M2 the channel information that indicates over which of the several channels the individual information data units are transmitted. Accordingly, desired data can be quickly obtained at each terminal M2 by referring to the channel information. Also, even when the information data units transmitted over the channels frequently change, by changing the channel information at the central control unit M1 in response to those changes, the changes in the channel content can be easily dealt with.

Next, a concrete example of the first embodiment of the data transmission system will be described below. The concrete example is a karaoke system to which applied is the first embodiment of the present invention. In the karaoke system, a plurality of karaoke terminals and a center (central control unit) are connected by a transmission line.

Figure 2:
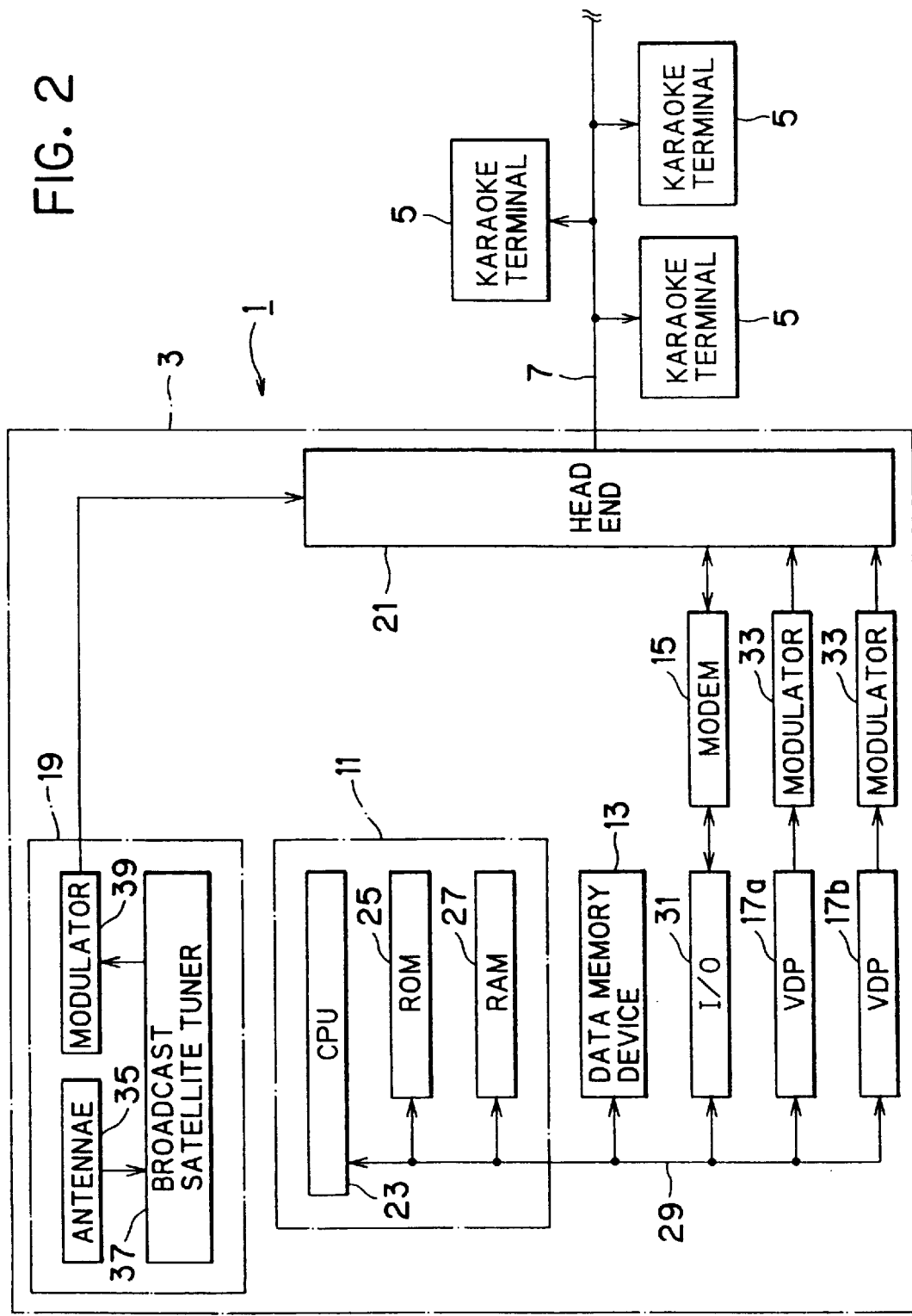
FIG. 2 is a block diagram showing schematic structure of an overall karaoke system and structure of a center according to concrete examples of first and second embodiment of the present invention.

As shown in FIG. 2, a karaoke system 1 according to the concrete example of the first embodiment is constructed from a center 3 connected to a plurality of karaoke terminals 5 by coaxial cable 7 (transmission line). The karaoke terminals 5 can be provided in separate buildings or in separate shops or booths within the same building.

Next, an explanation of configuration of the center 3 will be provided while referring to FIG. 2.

The center 3 includes a server (control portion) 11 for performing overall control of the center; a memory device 13 in which karaoke song data are stored; a center modem 15; background image output devices (VDP) 17a and 17b; broadcast satellite reception system 19; a head end 21, etc.

The server 11 includes well-known components such as a central processing unit (CPU) 23, a ROM 25, and a RAM 27. A busline 29 is provided for connecting the server 11 to the memory device 13, an input/output interface (I/O) 31, the background image output devices 17a and 17b, and the like.

A large-capacity memory device, such as a hard disk or a magnetooptic disk, is used in the memory device 13. Several thousand songs worth of karaoke song data are stored in the memory device 13. Karaoke song data for newly released songs are directly inputted in the memory device 13. Alternatively, the data can be inputted to the memory device 13 via a telephone circuit from a host computer (not shown) connected to the center 3.

As shown in FIG. 4, one song worth of karaoke song data D1 includes a synchronization signal D3; song number data D5 that indicates the song number; song content data D7; and partition data D9 for indicating the end of one song worth of karaoke song data. The song content data D7 includes lyric data, for being projected on a monitor television of the karaoke terminal 5 (to be described later), and instrumental or vocal accompaniment data, for being played by a sound source of the karaoke terminal 5 (also to be described later.) It is noted that the accompaniment data is MIDI (Musical Instrument Digital Interface) standard data.

The center modem 15 is for modulating a plurality of karaoke song data retrieved from the memory device 13 to be divided into several different channels, that is, alternating current signals with different frequency bands.

More specifically, all the plurality of karaoke song data retrieved from the memory device 13 are modulated by the center modem 15 to be divided among several channels. A more concrete example will be described while referring to FIG. 5 (a). In this example, karaoke song data for all songs (6,000 songs) stored in the memory device 13 are modulated to be divided among six different channels C30 through C35 so that, for example, C30 transmits karaoke song data of songs numbered 0 through 999 and C31 transmits karaoke song data of songs numbered 1,000 through 1,999. The karaoke song data that are divided by the channels are serially transmitted over the corresponding channels to each of the karaoke terminals 5 via the head end 21 and the coaxial cable 7. More concretely, the center modem 15 outputs these karaoke song data to the head end 21, which in turn transmits them to all of the plurality of karaoke terminals 5. The method of transmitting the karaoke song data will be explained later.

The background image output devices (video disk players) 17a and 17b are for outputting background image data (video signals according to standard National Television System Committee (NTSC) system) for projecting on the monitor televisions 53 of the karaoke terminals 5 (to be described later). The background image data are categorized according to genre of the requestable karaoke songs. In this example, one output device 17a may store image data representative of images directed toward Japanese ballads (Enka), and the other output device 17b may store image data representative of images directed toward popular songs. Each of background image output devices 17a and 17b is connected to an individual modulator 33. The background image data from the devices 17a and 17b are modulated by the corresponding modulators 33 into alternating current signals of different channels and outputted to the head end 21. It is noted that the channels for the background image data are different from the channels C30–C35 over which the karaoke song data are transmitted. It is further noted that each of the devices 17a and 17b always outputs the background image data. Accordingly, the background image data are always transmitted to the terminals 5.

The broadcast satellite reception system 19 includes a reception antennae 35, a broadcast satellite tuner 37, and a modulator 39. The modulator 39 is connected to the head end 21. The tuner 37 outputs broadcast satellite signals including broadcast satellite image signals and broadcast satellite sound signals. The modulator 39 modulates the broadcast satellite signals from the tuner 37 into alternating current signals of a channel (frequency band) which is different from the channels (frequency bands) over which the karaoke song data and the background image data are transmitted. It is further noted that the tuner 37 always outputs the broadcast satellite signals. Accordingly, the broadcast satellite signals are always transmitted to the terminals 5.

The head end 21 includes a variety of devices (not shown) such as a mixer for mixing signals inputted thereto and outputting the mixed signals to the coaxial cable 7. More specifically, the head end 21 has inputted thereto the karaoke song data sent from the center modem 15; the background image signals sent from the modulators 33; and the broadcast satellite signals sent from the modulator 39 which have been modulated in the different channels. The head end 21 multiplexes the plurality of different channel signals and outputs them to the coaxial cable 7, along which the multiplexed signals are transmitted to the karaoke terminals 5.

Figure 3:
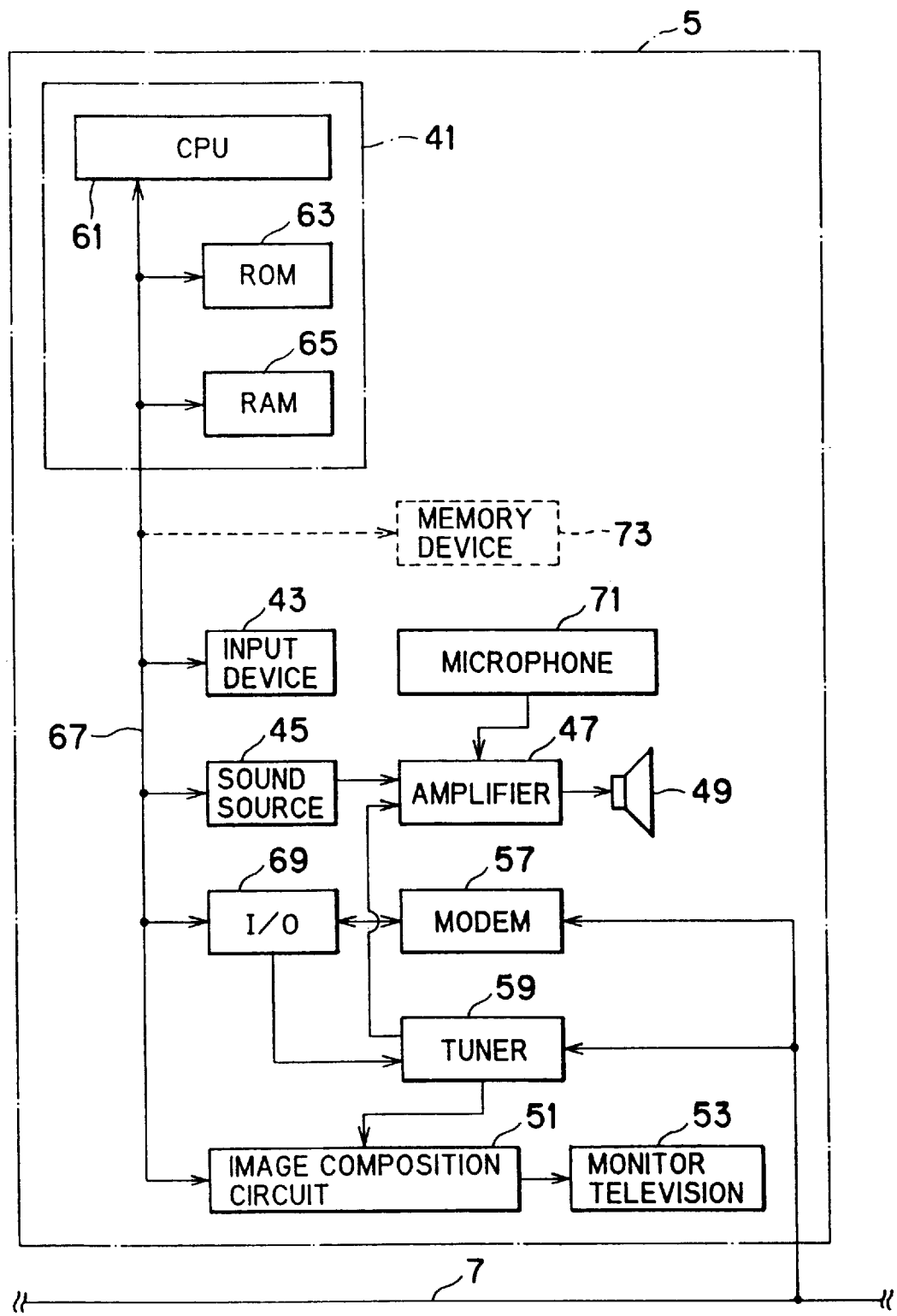
FIG. 3 is a block diagram indicating structure of a karaoke terminal of the concrete examples of the first and second embodiments.

Next, an explanation of the structure of each of the plurality of karaoke terminals 5 will be provided while referring to FIG. 3.

Each karaoke terminal 5 includes a control portion 41 for overall control of the terminal, an input device 43, a sound source 45, an amplifier 47, a speaker 49, an image composition circuit 51, a monitor television 53, a terminal modem 57 for receiving and processing the signals (the plurality of karaoke song data) sent from the center 3, and a video tuner 59 for receiving and processing the signals (the background image data and the broadcast satellite signals) sent from the center 3.

The control portion 41 includes a CPU 61, a ROM 63, and RAM 65, and is connected to the input device 43, the sound source 45, an input/output interface 69, the image composite circuit 51, etc. via a busline 67. The RAM 65 previously stores therein a channel information data which indicates a channel over which data of each karaoke song is being transmitted. The RAM 65 also previously stores therein a song name/song genre information data indicating a genre of each of a plurality of karaoke songs requestable by each terminal 5. Examples of genre include Japanese ballads (enka) and popular songs, in this concrete example. The RAM also serves to temporarily store karaoke song data for a karaoke song requested at the input device 43 which has been transmitted from the center 3.

The input device 43 includes a variety of switches by which a user operates the karaoke terminal 5. Specifically, the input device 43 includes: a variety of mode switches (not shown) for selecting between a broadcast satellite mode for watching a broadcast satellite and a karaoke mode for performing karaoke songs; and a number pad (ten key) for inputting song numbers of karaoke songs requested by the user to sing.

The terminal modem 57 is for receiving and demodulating the karaoke song data transmitted from the center 3 via the coaxial cable 7. The karaoke song data demodulated by the modem 57 are then processed by the control portion 41, and a karaoke song data for the requested song is temporarily stored in the RAM 65. After being temporarily stored in the RAM 65, the karaoke song data for the requested song is again retrieved for karaoke performance processes. The karaoke performance processes will be explained later.

The video tuner 59 is for receiving the satellite broadcast signal, outputted from the broadcast satellite reception system 19 and transmitted from the center 3, and the background image signals, outputted from the background image output devices 17a and 17b and transmitted from the center 3. The video tuner 59 is controlled by the control portion 41 to select either one of the plurality of channels over which the desired signal is being transmitted.

A microphone 71 is provided in each terminal 5 to produce a singing voice signal when a user sings into the microphone.

The sound source (synthesizer sound source) 45 is for converting the MIDI data (accompaniment data), included in the karaoke song data shown in FIG. 4, into a karaoke accompaniment/sound signal.

The amplifier 47 is for receiving both the karaoke accompaniment/sound signal and the singing voice signal from the microphone 71. The amplifier 47 mixes the accompaniment/sound signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 having the above-described structure will be provided.

First, an explanation of the operation for transmitting the karaoke song data from the center 3 to all of the plurality of terminals 5 will be provided.

The control portion 11 of the center 3 controls the modem 15 to modulate all the karaoke song data stored in the memory device 13 to be divided over the several channels and to transmit the karaoke song data in succession over each channel within a fixed time period (a permissible time period for a user to wait from when the user requests a desired song until when the performance of the song begins) to the karaoke terminals 5 via the coaxial cable 7. This operation is performed regardless of whether or not a song is requested from one of the karaoke terminals 5.

More specifically, the plurality of karaoke song data stored in the memory device 13 are transmitted to the center modem 15 via the input/output interface 31 and modulated to be divided among several channels. The karaoke song data that are thus divided by the several channels are serially transmitted to each of the karaoke terminals 5 via the head end 21 and the coaxial cable 7. When transmission of all songs is completed, transmission from the first song is repeated for every channel.

In the above-described concrete example shown in FIG. 5 (*a*), the total number of the karaoke songs is 6,000, and the karaoke song data for all the 6,000 karaoke songs are divided into the six channels (down streams) C30–C35. If each karaoke song data includes 50 KBs of data, because the total number of the songs is 6000, the karaoke song data totally include 300 MBs (=6000×50 KBs). If the transmission rate is 10 Mbps (bits/sec.), all songs can be transmitted in a time cycle of about 40 seconds (300 MB×8 bits/(10 Mbps×6 channels)≈40 seconds). Accordingly, desired karaoke song data will be transmitted to a karaoke terminal 5 after waiting a maximum of 40 seconds from the time of request.

Next, an explanation of operations at each of the karaoke terminals 5 for requesting a desired song and producing a karaoke song will be provided while referring to the flow chart in FIG. 6.

First, the CPU 61 judges whether a song number of a requested song has been inputted via the input device 43, in step S1. If no request has been made, then the step S1 is repeated. If a song number has been inputted, the CPU 61 refers to the channel information data stored in the RAM 65, and controls the terminal modem 57 to properly receive transmission of the channel over which the requested song will be transmitted, in step S3. In the same way, in step S5, the CPU 61 refers to the song name/song genre information data stored in the RAM 65, and switches the video tuner 59 to a channel over which a background image signal corresponding to the genre of the requested song will be transmitted.

Next, in step S7, the CPU 61 refers to the song number data D5, included in each of the plurality of karaoke song data transmitted serially at the channel selected in step S3, and judges whether the transmitted karaoke song data represents the user's requested song. If not for the desired song, step S7 is repeated. However, if the data is for the requested song, the corresponding karaoke song data is temporarily stored in the RAM 65. Afterward, karaoke performance processes are performed in step S9.

In the step S9, the CPU 61 retrieves the karaoke song data stored temporarily in the RAM 65. The CPU 61 inputs the lyric data included in the karaoke song data into the image composition circuit 51 where the lyric data is converted into a lyric/image signal. The CPU 61 also inputs the background image signal transmitted over the channel selected by the video tuner 59 into the image composition circuit 51. The background image and the lyric/image signal are superimposed by the image composition circuit 51, whereupon the characters of the lyrics are displayed on the monitor television 53 superimposed on the background image.

On the other hand, the MIDI data included in the retrieved karaoke song data is converted into an accompaniment signal by the sound source 45 and inputted to the amplifier 47. The accompaniment signal is mixed with the voice signal from the microphone 71 as sung by a user, amplified appropriately, and outputted to the speaker 49.

When the above-described karaoke performance process of step S9 is completed, the CPU 61 judges whether to continue the karaoke song performance in step S11. If the performance is to be continued, the program returns to step S1 whereupon steps S1 through S9 are repeated. If the karaoke song performances are to be terminated, this program is temporarily completed.

In this way, in the karaoke system according to the first embodiment, the center serially transmits the plurality of karaoke song data, in the form of a plurality of song data units, including information such as lyrics and accompaniment music to the karaoke terminals 5 via the transmission line 7. In each of the karaoke terminals 5, one karaoke song data unit for the requested song is selected from the serially transmitted plural karaoke song data, and is reproduced. The accompaniment and lyrics included in the selected karaoke song data unit are then outputted to the speaker 49 and the monitor television 53, respectively. Because there is no need to transmit polling signals in succession from the center 3 to the plurality of karaoke terminals 5 to confirm whether a request has been made, the karaoke song data of the requested song can be received with only a short waiting time without relevance to the number of terminals performing karaoke songs. Accordingly, this system has the great advantage that users can sing karaoke song quickly.

Also, the center 3 is always transmitting a set volume of karaoke song data regardless of whether a request is made at the karaoke terminals 5. Therefore, the burden to the center can be maintained at a constant level.

In the above description, the channel information indicating the channel over which each karaoke song data is transmitted is previously stored in the RAM 65 of each terminal. However, a channel information transmission channel can be additionally provided separate from the channels for transmitting karaoke song data.

More specifically, as shown in FIG. 5 (*a*), channel information can be transmitted by a channel C28 that is separate from the channels C30 through C35 that transmit the karaoke song data. When a request is inputted to the karaoke terminal 5, the control portion 41 first controls the modem 57 to select the channel C28 to receive the channel information transmitted through the channel C28. Then, the control portion 41 processes the received channel information to obtain the data indicating which channel the requested song is transmitted over. Then, the control portion 41 controls the modem 57 to select the channel out of the channels C30–C35, and obtains the karaoke song data of the requested song.

Therefore, the karaoke song data of the requested song can be obtained quickly. Regardless how frequently the content of the channels changes, only the channel information from the center need be changed. Therefore, changes in the content of the channels can be dealt with easily.

Next, an explanation of a second preferred embodiment of the present invention will be provided.

Figure 7:
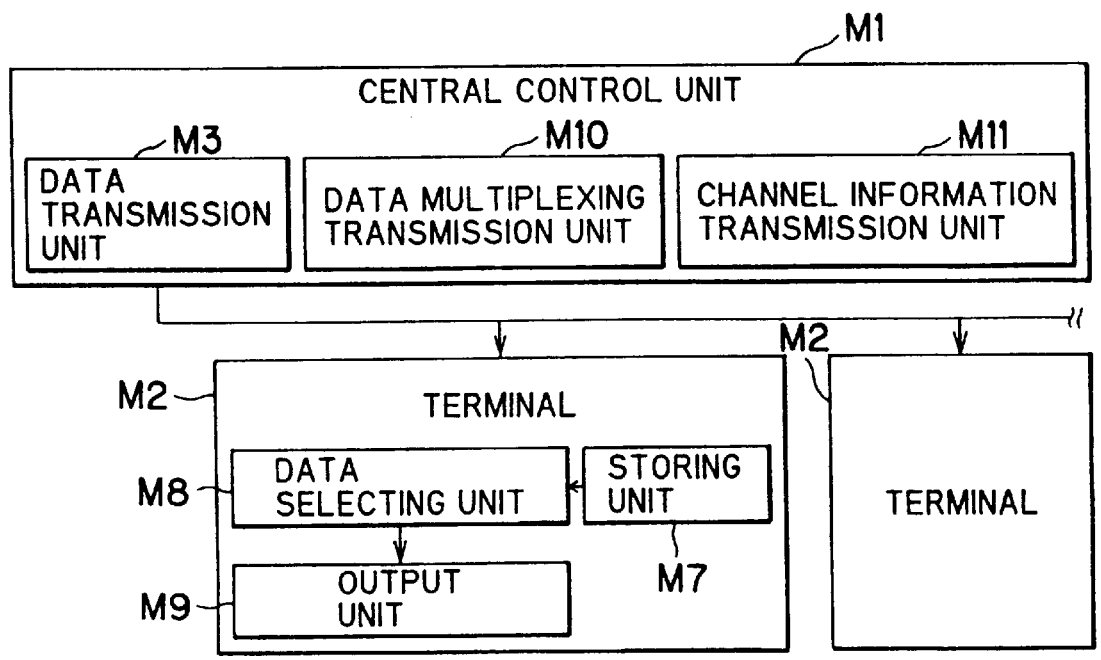

As shown in FIG. 7, in a data transmission system according to the second embodiment, a central control unit M1 and a plurality of terminals M2 are connected by a transmission line. Information data including image information and/or sound information is used at each of the terminals M2. The central control unit M1 includes a data transmission unit M3 for serially transmitting, to each of the terminals M2, information data newly registered in the central control unit M1 in the form of a plurality of information data units. Each of the terminals M2 includes a memory unit M7 for previously storing original information data in the form of a plurality of information data units. The memory unit M7 also stores the newly registered plurality of information data units which have been serially transmitted from the data transmitting unit M3. Each terminal M2 further includes: a data selection unit M8 for selecting data units of desired information data from the plurality of information data units stored in the memory means M7; and an output unit M9 for reproducing the information data units selected by the data selection unit M8 and outputting the image information and/or the sound information.

In the data transmission system as constructed above, the data transmission unit M3 provided to the central control unit M1 prepares the information data newly registered in the central control unit M1 in the form of a plurality of information data units, and serially transmits them to each of the terminals M2. The plurality of data units of the original information data have been previously stored in the memory device M7 of each terminal M2. The plurality of data units of the newly registered information data serially transmitted from the data transmission unit M3 are also stored in the memory device M7 of each terminal M2. The data selection unit M8 of each terminal M2 selects data units of the desired information data from the memory device M7. The output unit M9 reproduces the selected information data units and outputs the image information and/or the sound information. Accordingly, there is no need for transmitting polling signals from the central control unit M1. Further, because the information data units have been partly stored previously in each terminal M2, the desired information data units can be obtained at each terminal M2 with only a short waiting period. Also, the amount of data transmitted from the central control unit M1 is reduced so that the load on the central control unit M1 is reduced.

The central control unit M1 may preferably include a data multiplexing transmission unit M10 for dividing the plurality of newly registered information data units to several channels and serially transmitting them over each of the channels to the terminals; and a channel information transmission unit M11 for transmitting channel information that indicates over which of the several channels each of the plurality of information data units is transmitted to the terminals. In this case, the data multiplex transmission unit M10 divides the plurality of newly registered information data units over the several channels and serially transmits them over each of the several channels to the terminals M2. The channel information transmission unit M11 transmits to the terminals M2 the channel information that indicates over which of the several channels the individual information data units are transmitted. Accordingly, desired data can be quickly obtained at each terminal M2 by referring to the channel information. Also, even when the information data units transmitted over the channels frequently change, by changing the channel information at the central control unit M1 in response to those changes, the changes in the channel content can be easily dealt with.

Next, a concrete example of the second embodiment of the data transmission system will be described below. The concrete example is a karaoke system to which applied is the second embodiment of the present invention. The karaoke system of this example has almost the same structure as that shown in FIGS. 2 and 3, except that each terminal 5 has a memory device 73 as indicated by dotted line in FIG. 3. Also in the second embodiment, each karaoke song data is in the form as shown in FIG. 4. Contrary to the first embodiment, the second embodiment uses the plurality of channels as shown in FIG. 5 (b).

In this concrete example of the second embodiment, not all the karaoke song data are transmitted as in the first embodiment. Only karaoke song data of new songs (newly released songs) are serially transmitted from the center 3. The karaoke song data of new songs are then serially stored in the memory device 73 of FIG. 3 provided to each karaoke terminal 5. That is, for example, karaoke song data of new songs released for the period between December 1992 and June 1993 are divided between seven channels so that, as shown in FIG. 5 (b), new songs from December 1992 (30 songs) are transmitted over a channel C30, new songs for January 1993 are transmitted over a channel C31, and the like. The new songs are serially transmitted from the center 3 to the karaoke terminals 5 in the same way as in the first embodiment. The karaoke song data for the new songs can be continually repeatedly transmitted, or can be transmitted for a limited time, such as at the beginning of every month.

The memory device 73 provided to each karaoke terminal 5 is a comparatively large capacity memory (for example, a hard disk). About 3,000 songs worth of karaoke song data can be previously stored in the memory device 73 when the karaoke terminal 5 is produced. The karaoke terminal 5 is then set up at the user's facility. After connecting the karaoke terminal 5 to the center 3, the karaoke song data of new songs transmitted serially from the center 3 at the beginning of each month can be stored also in the memory device 73 of the karaoke terminal 5. When a user requests a new song, a corresponding karaoke song data is retrieved directly from the memory device 73 provided to the karaoke terminal 5 and performed.

Preferably, seven months worth of channels C30 through C36 are prepared in the transmission of the new song data. This is because a distribution stock period until a karaoke terminal 5 is set up is estimated as seven months. That is, sometimes the time period (distribution stock period) from when the karaoke terminal 5 is manufactured and delivered until it is set up at the facilities of the user can be several months. Karaoke song data of new songs released during this period will therefore not be stored in the memory device 73. Therefore, the distribution stock period is estimated at about seven months, and new songs can be received over a certain period.

Although the cost of the karaoke terminal 5 in the second embodiment is slightly higher than the cost of the karaoke terminal 5 in the first embodiment, the number of songs transmitted from the center 3 is reduced, and the load on the server 11 is reduced. Further, the time until a karaoke song is performed can be reduced.

Similarly to the first embodiment, as shown in FIG. 5 (b), channel information may be transmitted by the channel C28 provided separately from the channels C30 through C36 for the new song transmission. At the beginning of each month, first, the channel information is processed in the karaoke terminal 5 by the control portion 41. After obtaining the data indicating over which channel the new songs of a certain month will be transmitted is obtained, that channel is selected and the karaoke song data of the new songs are stored in the above-described memory device 73. In this case, karaoke song data of new songs each month can be quickly obtained. Changes in the content of channels can be easily coped with.

As described above, according to the data transmission device of the present invention, the central control unit prepares information, including image and/or sound information, in the form of the plurality of information data units. The central control unit serially transmits the plurality of data units to each of the terminals. The data selection unit in each terminal selects data units of desired information data from the serially transmitted information data units. The output means reproduces and outputs the selected information data. Accordingly, there is no need to transmit polling signals in succession from the central control unit to the plurality of terminals and there is the benefit of desired information data being quickly obtainable with only a short waiting period at the terminal.

In the data transmission device, each terminal may be provided with a memory device in which a plurality of information data are previously stored and new information data serially transmitted from the data transmission means is also stored. Therefore, the amount of data transmitted from the central control unit is reduced so that the load on the central control unit is reduced. Because the information data are thus partially stored previously in each terminal, there is an advantage that the desired information data can be obtained with only a short waiting period.

Further, the central control unit may divide the information data over several channels and serially transmits them over a corresponding channel to the terminals. The central control unit may also transmit to the terminals channel information that indicates over which of the several channels individual information data is transmitted. Accordingly, there are the benefits that desired data can be obtained at each terminal with only a short waiting period by referring to the channel information and necessary information can be quickly stored. Also, even when the content of information data transmitted over each channel frequently changes, by changing the channel information at the central control unit in response to those changes, there is the advantage that the changes in the channel content can be easily dealt with.

While the invention has been described in detail with reference -to specific embodiments thereof, it would be apparent to those skilled in the art that various changes and modifications may be made therein without departing from the spirit of the invention.

For example, the present invention is not limited to application to a karaoke system but can also be applied to systems for providing various types of information such as weather reports and traffic information. When this information data is prepared in the form of a plurality of information data units, various methods of preparing the information can be considered. For example, weather reports for a specific area can be set as one unit of information data.

What is claimed is:

1. A data transmission system for transmitting, to each of a plurality of terminals, information which each terminal desires to receive, the data transmission system comprising:

a central control unit; and a plurality of terminals connected to said central control unit via a transmission line, wherein said central control unit includes data storing means for storing a plurality of data units and data multiplexing transmission means for serially transmitting the plurality of data units, each indicative of an individual information, over several channels via the transmission line to each of the plurality of terminals via the transmission line, the data multiplexing transmission means including modulating means for modulating each of the plurality of data units into an alternating current signal of a frequency band corresponding to one of the several channels, to thereby transmit the each data unit over the corresponding channel, and wherein each of the plurality of terminals includes:

selecting means for selecting a data unit, indicative of information that the each terminal desires to receive, from the plurality of data units transmitted from the central control unit, each selecting means including:

channel selecting means for selecting a channel over which the data unit indicative of the desired information is transmitted;

data selecting means for selecting one data unit indicative of the desired information out of the plurality of data units transmitted over the channel selected by the channel selecting means, the data storage means storing the selected data unit at least temporarily until the output means processes the data unit;

judging means for determining which of the plurality of data units transmitted from the central control unit is indicative of the desired information; and data input means for storing, into the data storage means, one data unit determined indicative of the desired information, the data storage means temporarily storing the data unit, the output means processing the data unit stored in the data storage means to output the desired information; and request input means for inputting a request for receiving the data unit of the desired information, the data transmission means of the central control unit serially and repeatedly transmitting the plurality of data units regardless of whether a request is inputted by the request input means of each terminal, the judging means determining, in accordance with the inputted request, which of the plurality of data units is the data unit of the desired information;

output means for processing the data unit; selected by the selecting means and for outputting the desired information;

terminal data storage means for storing at least the data unit selected by the selecting means, the terminal data storage means storing the selected data unit at least temporarily until the output means processes the data unit; and channel information storing means for storing channel information that indicates over which of the several channels each of the plurality of data units is transmitted, wherein the channel selecting means selects the channel over which the data unit indicative of the desired information is transmitted, in accordance with the channel information.

2. A data transmission system as claimed in claim 1, wherein the multiplexing transmission means includes channel information transmission means for transmitting, to each of the plurality of terminals, channel information that indicates over which of the several channels each of the plurality of data units is transmitted, and wherein the channel selecting means of each of the plurality of terminals selects the channel over which the data unit indicative of the desired information is transmitted, in accordance with the channel information.

3. A data transmission system as claimed in claim 1, wherein the data storage means of each of the plurality of terminals includes data unit storing means for storing the plurality of data units serially transmitted from the central control unit, the selecting means of each of the plurality of terminals selecting the data unit, indicative of the desired information, from the plurality of data units transmitted from the central control unit and stored in the data unit storing means, the output means processing the selected data unit and outputting the desired information.

4. A data transmission system as claimed in claim 3, wherein the data unit storing means previously stores a plurality of additional data units indicative of individual information, the selecting means of each of the plurality of terminals selecting the data unit, indicative of the desired information, from the plurality of data units and the plurality of additional data units stored in the data unit storing means, the output means processing the selected data unit and outputting the desired information.

5. A data transmission system as claimed in claim 1, wherein each of the plurality of terminals further includes input means for inputting a request for receiving the data unit of the desired information, the selecting means selecting the data unit of the desired information, in accordance with the inputted request.

6. A data transmission system as claimed in claim 5, wherein each of the plurality of data units, transmitted to each of the plurality of terminals, includes information on a corresponding one of a plurality of images, wherein the input means of each of the plurality of terminals includes image request means for inputting a request for receiving the data unit of a desired image, wherein the selecting means selects the data unit of the desired image, in accordance with the inputted request, and wherein the output means processes the data unit selected by the selecting means so as to display the desired image, the data storage means temporarily storing the selected data unit at least until the output means processes the data unit.

7. A data transmission system as claimed in claim 5, wherein each of the plurality of data units, transmitted to each of the plurality of terminals, includes information on a corresponding one of a plurality of sounds, wherein the input means of each of the plurality of terminals includes sound request means for inputting a request for receiving the data unit for a desired sound, wherein the selecting means selects the data unit of the desired sound, in accordance with the inputted request, and wherein the output means processes the data unit selected by the selecting means so as to play the desired sound, the data storage means temporarily storing the selected data unit at least until the output means processes the data unit.

8. A data transmission system as claimed in claim 5, wherein each of the plurality of data units, transmitted to each of the plurality of terminals, includes information on a corresponding combination of a plurality of combinations of image and sound, wherein the input means of each of the plurality of terminals includes image and sound request means for inputting a request for receiving the data unit of a desired image and sound, wherein the selecting means selects the data unit of the desired image and sound, in accordance with the inputted request, and wherein the output means processes the data unit selected by the selecting means so as to display the desired image and play the desired sound, the data storage means temporarily storing the selected data unit at least until the output means processes the data unit.

9. A data transmission system as claimed in claim 5, wherein each of the plurality of data units, transmitted to each of the plurality of terminals, includes lyric data and accompaniment data for a corresponding one of a plurality of karaoke sounds, wherein the input means of each of the plurality of terminals includes song request means for inputting a request for receiving the data unit for a desired karaoke song, and wherein the output means processes the lyric data and the accompaniment data of the data unit selected by the selecting means so as to display a lyric image for the requested karaoke song and to play an accompaniment sound for the requested karaoke song, the data storage means temporarily storing the selected data unit at least until the output means processes the data unit.

10. A data transmission system as claimed in claim 1, wherein the data transmission means of the central control unit transmits the plurality of data units over a plurality of channels, the data transmission means including channel information transmission means for transmitting, to each of the plurality of terminals, channel information that indicates over which of the plurality of channels each of the plurality of data units is transmitted, and wherein the judging means of each of the plurality of terminals includes channel selecting means for selecting, in accordance with the transmitted channel information, a channel over which the data unit indicative of the desired information is transmitted, the judging means judging which of the data units transmitted over the selected channel is indicative of the desired information, the data input means storing, into the data storage means, one data unit judged to be indicative of the desired information.

11. A data transmission system as claimed in claim 3, wherein each of the plurality of terminals further includes request input means for inputting a request for receiving the data unit of the desired information, the data transmission means of the central control unit serially and repeatedly transmitting the plurality of data units regardless of whether a request is inputted by the request input means of each terminal, the selecting means of each terminal selecting the data unit indicative of the desired information in accordance with the inputted request.

12. A data transmission system as claimed in claim 1, wherein the data transmission system is a music distribution system, and wherein each of the data units comprises music information.

13. A data transmission system as claimed in claim 12, wherein each of the plurality of terminals is a karaoke terminal and wherein each of the plurality of data units comprise karaoke song data.

14. A data transmission system for transmitting information from a central control unit toward a plurality of terminals connected to the central control unit via a transmission line, the data transmission system comprising:

a central control unit; and a plurality of terminals connected to said central control unit via a transmission line, wherein said central control unit includes data transmission means for serially transmitting a plurality of information data units of a plurality of individual information to each of said plurality of terminals via the transmission line, data multiplexing transmission means for dividing the plurality of information data units to a plurality of channels and serially transmitting them to each of said plurality of terminals via the transmission line over the corresponding channels and channel information transmission means for transmitting channel information that indicates which of the plurality of channels each information data unit is transmitted on to each of said plurality of terminals, and wherein each of said plurality of terminals includes:

data selecting means for selecting an information data unit of a desired information from the plurality of information data units serially transmitted from said central control unit;

temporary data storage means for temporarily storing the information data unit selected by the data selection means;

output means for processing the information data unit stored in the temporary data storage means and outputting the desired information;

request input means for inputting a request for receiving the information data unit of the desired information, the data transmission means of the central control unit serially and repeatedly transmitting the plurality of data units regardless of whether a request is inputted by the request input means of each terminal; and judging means for determining which of the plurality of information data units is the data unit of the desired information in accordance with the inputted request.

15. A data transmission system as claimed in claim 14, wherein the data selecting means of each of the plurality of terminals includes data input means for storing, into the temporary data storage means, an information data unit judged to be indicative of the desired information.

16. A data transmission system as claimed in claim 14, wherein each of the plurality of terminals is a karaoke terminal and wherein each of the plurality of data units comprise karaoke song data.

17. A data transmission system for transmitting information from a central control unit toward a plurality of terminals connected to the central control unit via a transmission line, the data transmission system comprising:

a central control unit; and a plurality of terminals connected to said central control unit via a transmission line, wherein said central control unit includes:

data input means for inputting a plurality of new information data inputs of a plurality of new information;

data transmission means for serially transmitting the plurality of new information data units inputted to the data input means to each of said plurality of terminals via the transmission line;

data multiplexing transmission means for dividing the plurality of new information data units to a plurality of channels and serially transmitting them to each of said plurality of terminals via the transmission line over the corresponding channels; and channel information transmission means for transmitting channel information that indicates which of the plurality of channels each new information data unit is transmitted on to each of said plurality of terminals, and wherein each of said plurality of terminals includes:

memory means for previously storing a plurality of original information data of a plurality of original information, the memory means storing the plurality of new information data serially transmitted from the data transmitting means;

data selection means for selecting an information data unit of a desired information from the plurality of original information data units and the plurality of new information data units stored in the memory means;

output means for processing the information data unit selected by the data selection means and outputting the desired image; and request input means for inputting a request for receiving the data unit of the desired information, the data transmission means of the central control unit serially transmitting the plurality of new information data units regardless of whether a request is inputted by the request input means of each terminal, the data selection means of each terminal selecting the information data unit indicative of the desired information in accordance with the inputted request.

18. A data transmission system as claimed in claim 17, wherein each of the plurality of terminals is a karaoke terminal and wherein each of the plurality of data units comprise karaoke song data.

19. A data transmission system for transmitting, to each of a plurality of terminals, information which each terminal desires to receive, the data transmission system comprising:

a central control unit; and a plurality of terminals connected to said central control unit via a transmission line, wherein said central control unit includes data storing means for storing a plurality of data units and data multiplexing transmission means for serially transmitting the plurality of data units, each indicative of an individual information, over several channels via the transmission line to each of the plurality of terminals via the transmission line, the data multiplexing transmission means including modulating means for modulating each of the plurality of data units into an alternating current signal of a frequency band corresponding to one of the several channels, to thereby transmit the each data unit over the corresponding channel and channel information transmission means for transmitting, to each of the plurality of terminals, channel information that indicates over which of the several channels each of the plurality of data units is transmitted, and wherein the channel selecting means of each of the plurality of terminals selects the channel over which the data unit indicative of the desired information is transmitted, in accordance with the channel information, and wherein each of the plurality of terminals includes:

selecting means for selecting a data unit, indicative of information that the each terminal desires to receive, from the plurality of data units transmitted from the central control unit, each selecting means including:

channel selecting means for selecting a channel over which the data unit indicative of the desired information is transmitted;

data selecting means for selecting one data unit indicative of the desired information out of the plurality of data units transmitted over the channel selected by the channel selecting means, the data storage means storing the selected data unit at least temporarily until the output means processes the data unit;

judging means for determining which of the plurality of data units transmitted from the central control unit is indicative of the desired information; and data input means for storing, into the data storage means, one data unit judged to be indicative of the desired information, the data storage means temporarily storing the data unit, the output means processing the data unit stored in the data storage means to output the desired information; and request input means for inputting a request for receiving the data unit of the desired information, the data transmission means of the central control unit serially and repeatedly transmitting the plurality of data units regardless of whether a request is inputted by the request input means of each terminal, the judging means judging, in accordance with the inputted request, which of the plurality of data units is the data unit of the desired information;

output means for processing the data unit selected by the selecting means and for outputting the desired information; and data storage means for storing at least the data unit selected by the selecting means, the data storage means storing the selected data unit at least temporarily until the output means processes the data unit.

* * * * *